United States Patent
Yue et al.

(10) Patent No.: US 8,201,056 B2
(45) Date of Patent: Jun. 12, 2012

(54) ANTI-JAMMING PIECEWISE CODING METHOD FOR PARALLEL INFERENCE CHANNELS

(75) Inventors: Guosen Yue, Plainsboro, NJ (US); Xiaodong Wang, New York, NY (US); Mohammad Madihian, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 1120 days.

(21) Appl. No.: 12/033,306

(22) Filed: Feb. 19, 2008

(65) Prior Publication Data
US 2009/0210757 A1    Aug. 20, 2009

(51) Int. Cl.
*H03M 13/00* (2006.01)
*G06F 11/00* (2006.01)

(52) U.S. Cl. .......................................... 714/774; 714/704

(58) Field of Classification Search ............... 714/774, 714/704
See application file for complete search history.

(56) References Cited

U.S. PATENT DOCUMENTS

| | | | |
|---|---|---|---|
| 4,541,091 A * | 9/1985 | Nishida et al. | 714/756 |
| 4,718,066 A * | 1/1988 | Rogard | 714/751 |
| 5,226,043 A * | 7/1993 | Pughe et al. | 714/768 |
| 5,600,663 A * | 2/1997 | Ayanoglu et al. | 714/774 |
| 5,862,312 A * | 1/1999 | Mann et al. | 714/6.22 |
| 5,996,089 A * | 11/1999 | Mann et al. | 714/6.31 |
| 6,421,387 B1 * | 7/2002 | Rhee | 375/240.27 |
| 6,449,730 B2 * | 9/2002 | Mann et al. | 714/6.22 |
| 6,487,690 B1 * | 11/2002 | Schuster et al. | 714/752 |
| 6,516,435 B1 * | 2/2003 | Tsunoda | 714/751 |
| 6,526,038 B1 * | 2/2003 | Jain et al. | 370/347 |
| 6,557,114 B2 * | 4/2003 | Mann et al. | 714/6.24 |
| 6,567,926 B2 * | 5/2003 | Mann et al. | 714/6.22 |
| 6,571,349 B1 * | 5/2003 | Mann et al. | 714/6.22 |
| 6,574,745 B2 * | 6/2003 | Mann et al. | 714/5.11 |
| 6,675,346 B2 * | 1/2004 | Tsunoda | 714/774 |
| 6,851,084 B2 * | 2/2005 | Pattavina | 714/776 |
| 7,177,658 B2 * | 2/2007 | Willenegger et al. | 455/522 |
| 7,215,683 B2 * | 5/2007 | Burkert et al. | 370/476 |
| 7,428,691 B2 * | 9/2008 | Ouchi | 714/770 |
| 7,480,851 B2 * | 1/2009 | Chang et al. | 714/792 |
| 7,865,810 B2 * | 1/2011 | Chang et al. | 714/784 |
| 7,962,779 B2 * | 6/2011 | Patel et al. | 714/6.12 |

OTHER PUBLICATIONS

Chuang, J. et al., "Beyond 3G: Wideband Wireless Data Access Based on OFDM and Dynamic Packet Assignment", IEEE Commun. Magazine, vol. 38, No. 7, pp. 78-87, Jul. 2000.
Foschini, G.J. et al., "On Limits of Wireless Communications in a Fading Environment when Using Multiple Antennas", Wireless Personal Commun., vol. 6, pp. 311-335, Mar. 1998.
IEEE 802.22 Working Group on Wireless Regional Area Networks ("WRANs"), http://www.ieee802.org/22/.
Willkomm, D. et al., "Reliable Link Maintenance in Cognitive Radio Systems", in Proc. IEEE Int. Symp. New Frontiers Dynamic Spectrum Access Networks (DySPAN 2005), Baltimore, MD, pp. 371-378, Nov. 2005.

* cited by examiner

*Primary Examiner* — Joseph D Torres
(74) *Attorney, Agent, or Firm* — Joseph Kolodka

(57) ABSTRACT

An encoding of K blocks of information for transmission on N subchannels, responsive to a number of redundant blocks M, employs one of multiple check codes depending on the number of redundant blocks M and employs multiple processes for determining a code for the K blocks of information depending on the number of redundant blocks M and K blocks of information together.

17 Claims, 3 Drawing Sheets

Process 1     [Optimal design method for anti-jamming piecewise codes with $M = 3$.]

Set code length $N$ and jamming rate $p$.

(a) Compute $P_n$ according to (4).

(b) Initially set $P_e^*$.

For $l_1 = 0, 1, \cdots, N$,

For $l_2 = 0, 1, \cdots, N - l_1$ $\vdots$

For $l_6 = 0, 1, \cdots, N - \sum_{j=1}^{5} l_j$

- $l_7 = N - \sum_{j=1}^{6} l_j$.

-With $\{l_j\}$, compute $P_e(\{l_j\})$ according to (18) and (19).

- If $P_e(\{l_j\}) < P_e^*$, set $P_e^* = P_e(\{l_j\})$, $\mathcal{L}_3^* = \{l_j\}$.

End of $l_6$; End of $l_5$; $\cdots$; End of $l_1$.

(c) Output $\mathcal{L}_3^*$.

FIG. 3

Process 1

Algorithm 2 [Simple design method for anti-jamming piecewise codes with small $M > 3$.]

Set code length $N$.

(a) Compute $L^* = \lfloor N/(2^M - 1) \rfloor$, $N_L = N - L(2^M - 1)$, and set $l_j* = L^*, j = 1, \cdots, 2^M - 1$.

(b) Set $t = 0$. Do the following loops until $t = N_L$.

For $m = 1, \cdots, M$

For $j = 1, \cdots, 2^M - 1$

If the weight(binary of $j$) $= m$, Then $l_j^* = l_j^* + 1$, $t = t + 1$.

End of $j$; End of $m$.

(c) Output $\mathcal{L}_M^* = \{l_j^*\}$.

FIG. 4

ANTI-JAMMING PIECEWISE CODING METHOD FOR PARALLEL INFERENCE CHANNELS

BACKGROUND OF THE INVENTION

The present invention relates generally to communications, and more particularly, to an anti-jamming piecewise coding method for parallel inference channels

BACKGROUND OF THE INVENTION

Communication systems with multiple parallel physical channels have been widely deployed. Those parallel channels are achieved in time domain, i.e., each of the packets are transmitted in a different time slot, in the frequency domain such as orthogonal-frequency-division-multiplexing (OFDM) system, in a spatial domain such as the multiple-input multiple-output (MIMO) systems, respectively. With parallel channels, high throughput or high goodput can be achieved. On the other hand, a capability of throughput of more and more users also needs to be achieved in new wireless systems.

With more users, interference cannot be avoided if users share the same channels. The strong interference makes the receiver difficult to detect and decode the original messages, thus causes packet loss. Such collision between shared users on the same channel is also called jamming. Moreover, other channel impairments, e.g., deep fading, can also cause decoding failure and lead to packet loss. Another example for a parallel inference channel is a newly established cognitive radio system for reuse in the licensed spectrum in a new developing standard (IEEE 802.22). In such a system, the channels for secondary usage can be modeled as parallel channels, which suffer from strong interference from the primary users.

The packet loss due to jamming decreases throughput performance significantly. Anti-jamming coding techniques are then desired for recovering the lost packets to reduce the probability of packet loss and retransmission in parallel inference channels. One solution for anti-jamming is rateless coding. However, the rateless solution is not efficient for small redundancy or when the block length is not very large.

Accordingly, there is a need for an anti-jamming piecewise coding method for cognitive radio to improve the throughput efficiency with small redundancy and low complexity encoder and decoder.

SUMMARY OF THE INVENTION

In accordance with an aspect of the invention, a method for encoding includes encoding K blocks of information for transmission on N subchannels responsive to a number of redundant blocks M according to one of i) employing a single parity check code when the number of redundant blocks M is about 1; ii) employing a code exhibited by a code graph having one third of variable nodes are connected to one of the check nodes, another one third of variable nodes is connected to the other check node and the remaining one third of variable nodes is connected to both check nodes, when the number of redundant blocks M is 2; iii) employing a first process for determining a code for the K blocks of information, when the number of redundant blocks M is about 3 together with K blocks of information less than about 150 or the number of redundant blocks M is about 4 together with K blocks of information less than about 20; and iv) employing a second process for determining a code for the K blocks of information with redundant block M values other than for steps i), ii) and iii).

In accordance with another aspect of the invention, an encoder for encoding K blocks of information for transmission on N subchannels responsive to a number of redundant blocks M, comprising: i) a single parity check code when the number of redundant blocks M is about 1; ii) a code exhibited by a code graph having one third of variable nodes are connected to one of the check nodes, another one third of variable nodes is connected to the other check node and the remaining one third of variable nodes is connected to both check nodes, when the number of redundant blocks M is 2; iii) a code for the K blocks of information, when the number of redundant blocks M is about 3 together with K blocks of information less than about 150 or the number of redundant blocks M is about 4 together with K blocks of information less than about 20 determined by a first process; and iv) a code for the K blocks of information with redundant block M values other than for steps i), ii) and iii) determined according to a second process.

In accordance with a further aspect of the invention, A method for encoding an anti-jamming piece-wise code comprising the steps of encoding K blocks of information for transmission on N subchannels responsive to a number of redundant blocks M according to one of i) employing a single parity check code when the number of redundant blocks M is about 1; ii) employing a code exhibited by a code graph having one third of variable nodes are connected to one of the check nodes, another one third of variable nodes is connected to the other check node and the remaining one third of variable nodes is connected to both check nodes, when the number of redundant blocks M is 2; iii) determining an error rate responsive to a jamming rate and code length N and searching through a set of code graphs and corresponding error rates to determine a desired error rate for determining a code for the K blocks of information, when the number of redundant blocks M is about 3 together with K blocks of information less than about 150 or the number of redundant blocks M is about 4 together with K blocks of information less than about 20; and iv) partitioning the nodes to several sets to form a code graph that is a particular code for determining a code for the K blocks of information with redundant block M values other than for steps i), ii) and iii).

BRIEF DESCRIPTION OF DRAWINGS

These and other advantages of the invention will be apparent to those of ordinary skill in the art by reference to the following detailed description and the accompanying drawings.

FIG. 3 shows the method for finding optimal code parameters for M=3 redundant blocks, in accordance with the invention.

FIG. 4 shows the method for finding optimal code parameters for M>3 redundant blocks, in accordance with the invention.

DETAILED DESCRIPTION

Figure 1:
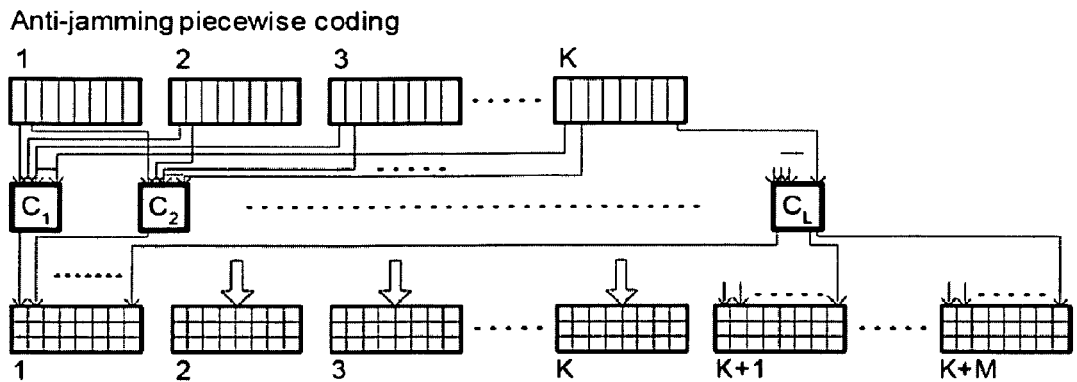
FIG. 1 is a block diagram of an anti-jamming piecewise coding method, in accordance with the invention.

ANTI-JAMMING PIECE-WISE CODING: The inventive anti-jamming coding scheme, also referred to herein as piecewise coding is shown in FIG. 1. Given K blocks of length-L information sequences, we pick all the first bits from the K blocks and encode them by a short linear block code $C_1$ to produce a length-N codeword. Similarly, we encode all the second bits from the K blocks by code $C_2$, and so on. After obtaining the total L length-N codewords, we form one block of coded sequence by picking one bit per codeword. We then obtain N blocks of coded sequences and transmit them through N subchannels. Every short code $C_i$ is a simple linear block code that can be efficiently encoded. To achieve low-complexity decoding, we use a message-passing technique for decoding $C_i$. Moreover, since there is no interleaving between the information bits and coded bits among the L block codes, the encoding and decoding of L codes can be implemented in parallel. Thus, low-latency can be achieved.

The same code C can be employed for all L codes, i.e., $C_1=C_2=\ldots=C_L=C$. By doing this, the implementation complexity can be further reduced, since they share the same encoder and decoder. The code C can also be a systematic code, in which case there are always K blocks information sequences in N blocks of coded bits. With systematic codes, if the lost packets cannot be recovered by this anti-jamming piecewise coding scheme, we only need to retransmit the lost information packets instead of retransmitting all KL bits. Another advantage for using the systematic code is fast response to the packet loss if decoders are not fully parallel. For example, if there is only one decoder, serial decoding has to be implemented for L codewords. When the first decoding process finishes and fails to decode all the bits, from all the failed information bits in this codeword, the receiver knows immediately which blocks are lost and need to be retransmitted even before the decoder finishes decoding all L codes since the failed bits exactly correspond to the lost packets. The code C being systematic can achieve higher throughput, lower complexity, and fast response to packet loss. With the same code C, the L codes can be encoded and decoded in parallel.

It is well known that the iterative decoding is not the optimal decoding algorithm, especially for the short block codes. The performance of iterative decoding may be far away from maximal-likelihood (ML) decoding. Therefore, it is important to design the short codes with near-optimal performance for erasure channels under iterative decoding. Below, we present the design of short block codes for anti-jamming piecewise coding, in accordance with the invention.

Figure 2:
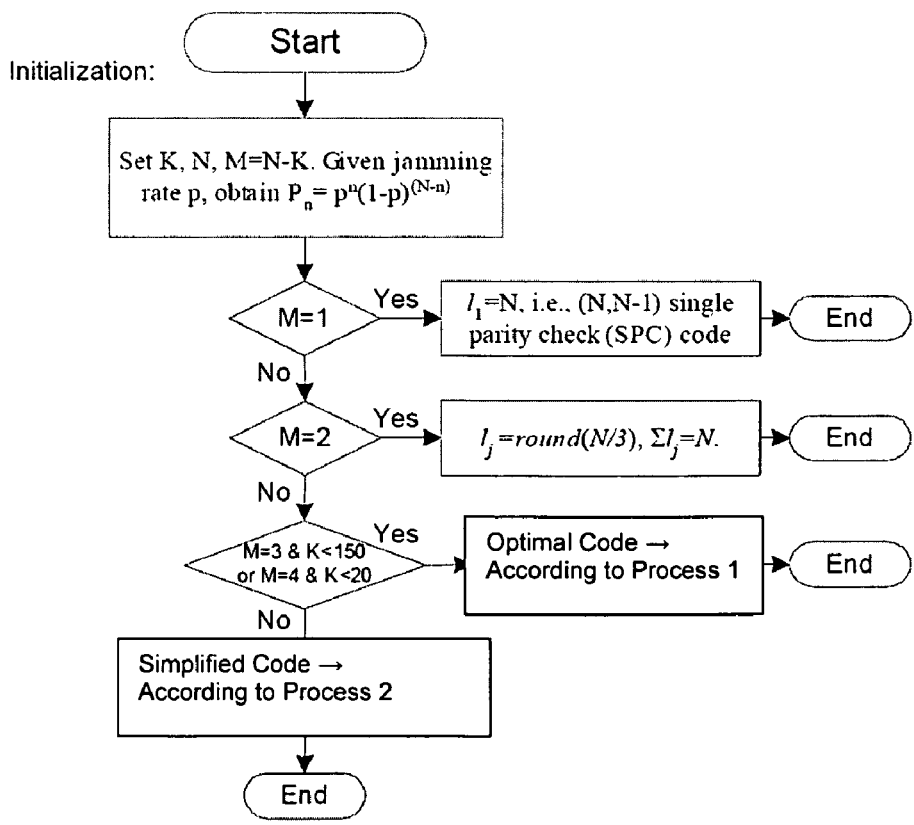
FIG. 2 is a flow diagram for determining an anti-jamming piecewise code for different code parameters, in accordance with the invention.

As shown by the flow diagram of FIG. 2, determination of an optimal anti-jamming piecewise code initially begins with values for various parameters such as K blocks of length L information, M redundant blocks, N subchannels and N-length codeword, jamming rate p and a probability of losing n packets defined by $P_n=p^n(1-p)^{(N-n)}$. Further analysis and explanation of the derivation of the code design choices for different M block values is discussed further below.

For 1 redundant block M the optimal code C is a single parity check code $l_1=N$. The code graph is defined by the set $\{l_j, j=1 \text{ to } 2^M-1\}$, where $l_j$ denotes number of variable nodes connected the check nodes with indices being the 1 positions of binary expression of j.

For 2 redundant blocks, M=2, the optimal solution is that $l_j=\lceil N/3 \rceil$ or $\lfloor N/3 \rfloor$, i.e., one third nodes are connected to one check nodes, one third are connected to the other check nodes, and the rest of one third are connected to both check nodes.

For 3 redundant blocks and less than 150 information blocks, i.e., M=3 & K<150, or 4 redundant blocks and less than 20 information blocks, i.e., M=4 & K<20, the optimal solution is not universal for different information blocks, K, and jamming rates p. A re-iterative process, according to FIG. 3 designated as Process 1 and the discussion below, is used to determine the optimal code.

For more than 3 or 4 redundant blocks not fitting within the previous M and K limits, i.e., M>3, or M=4 & K≥20 the optimal code solution for a given K and jamming rate p is determined according to FIG. 4 designated as Process 2 and the discussion below.

SHORT BLOCK CODE DESIGN FOR ANTI-JAMMING PIECEWISE CODING: As noted above, iterative decoding is not an optimal decoding technique, especially for short block codes. Therefore, it is important to design the short codes with near-optimal performance for erasure channels under iterative decoding. We present the design of short block codes based on the code graph and residual graphs for erasures for various numbers of redundant blocks M. The code graph is defined by $\{l_j, j=1 \text{ to } 2^M-1\}$, where $l_j$ denotes number of variable nodes connected the check nodes with indices being the 1 positions of binary expression of j. Given jamming rate p, we obtain $P_n=p^n(1-p)^{(N-n)}$.

a) Code design for M=1

The optimal code C is the single parity check (SPC) code, $l_1=N$. This solution is universal for any information blocks, K and any jamming rate p.

b) Code design for M=2.

The optimal solution for M=2 is that $l_j=\lceil N/3 \rceil$ or $\lfloor N/3 \rfloor$, i.e., one third of the nodes are connected to one check nodes, one third are connected to the other check nodes, and the rest of one third are connected to both check nodes. This solution is also universal for any information blocks, K and any jamming rate p.

c) Code design for M=3

The optimal solution is not universal for different information blocks, K and jamming rate p. The algorithm to find optimal code for given K and p is summarized and shown in FIG. 2.

where $$P_e(\{l_j\}) = P_2 \left( \sum_{j=1}^{7} l_j^2 - N \right) \bigg/ 2 + P_3 \left[ \sum_{j=1}^{7} \sum_{k \neq j} \binom{l_j}{2} l_k + \sum_{j=1}^{7} \binom{l_j}{3} + \sum_{(j_1, j_2, j_3) \in U} l_{j_1} l_{j_2} l_{j_3} \right]$$

Code design for small M>3

The optimal solution is difficult to obtain due to a large amount of code graphs. We then propose a simple method to construct a suboptimal code for small M>3. The method for the simple design met is summarized and shown in FIG. 3.

Throughput Analysis

We consider N blocks of data sequences carrying KL information bits transmitted through N parallel subchannels. Denote n as number of lost packets after demodulation and decoding. Assuming that the total jamming rate is p, the probability of losing n packets, $P_n$, is given by $$P_n = \binom{N}{n} p^n (1-p)^{N-n}, n = 0, 1, \ldots, N. \tag{4}$$

Denote E as the event of decoding failure. Since for n>M=N−K, the frame error probability is 1, we then obtain overall frame error probability $P_w$ for both anti-jamming coding schemes, given by $$P_w = Pr(n > M) + Pr(E | n \le M)Pr(n \ge M) \quad (5)$$

$$= \sum_{n=M+1}^{N} P_n + \sum_{n=0}^{M} Pr(E|n)P_n.$$

For rateless codes, denote $N_{dec}$ as the received number of bits for successful decoding of KL information bits. We then have $$Pr(E|n) = Pr(N_{dec} > (N-n)L). \quad (6)$$

With the parameters $\{c,\delta\}$, for practical rateless codes of block length k, $N_{dec}$ is a random variable with a certain distribution. Denote x as the overhead ratio, i.e., $$x = \frac{N_{dec} - KL}{KL}.$$

To obtain the analytical performance of rateless codes for anti-jamming, we first approximate the pdf of x using a Gaussian mixture, given by $$f(x) = \sum_{j=1}^{J} \pi_j \phi(x; \mu_j, \sigma_j^2), \quad (7)$$

$$\text{where } \phi(x; \mu_j, \sigma_j^2) = \frac{1}{\sqrt{2\pi\sigma_j^2}} e^{-(x-\mu_j)^2/(2\sigma_j^2)}.$$

Note that each component Gaussian pdf's in (7) should in fact be truncated Gaussian. However, the tail probability for x<0 is very small. Gaussian pdf is then good enough for the approximation in equation (7). From equation (5) to equation (7), we then obtain the frame error probability $P_w$ for anti-jamming rateless coding, given by $$P_w^{RL} = \sum_{n=M+1}^{N} P_n + \sum_{n=0}^{M} P_n \sum_{j=1}^{J} \pi_j Q\left(\frac{\frac{M-n}{K} - \mu_j}{\sigma_j}\right), \quad (8)$$

$$\text{where } Q(x) = \frac{1}{2\pi} \int_{x}^{+\infty} e^{-u^2/2} du.$$

The throughput efficiency of the anti-jamming rateless codes is then given by $$\eta^{RL} = \frac{K}{N}(1 - P_W^{RL}) = \frac{K}{N} \sum_{n=0}^{M} \sum_{j=1}^{J} \pi_j Q\left(\frac{\mu_j - \frac{M-n}{K}}{\sigma_j}\right). \quad (9)$$

The frame error probability for anti-jamming piecewise coding depends on the particular code structure. For small M, given the code graph or code structure, we can compute the error probability for n≤M, i.e., the second term in equation (5). Here we simply express the throughput efficiency for anti-jamming piecewise coding as $$\eta^{PW} = \frac{K}{N}(1 - P_w^{PW}). \quad (10)$$

Code Representation and Residual Graph

A linear block code can be represented by a Tanner graph, which consists of two types of nodes—variable nodes representing the code bits and check codes representing the parity-check constraints. An edge in the graph is placed between variable node i and check node m if $H_{mi}=1$ where $H_{mi}$ is the entry of the parity-check matrix H. The code graph can also be specified by a set representation. We first define ($2^M-1$) sets of variable nodes, $\Omega_j$, j=1, ..., $2^M-1$ for an (N,K) linear block code with M=N−K. A variable node in this code, for instance, the ith bit node, belongs to the set $\Omega_j$, if it satisfies $$j = \sum_{m=1}^{M} 2^{m-1} H_{mi}. \quad (11)$$

It is easily seen that the set $\Omega_j$ contains all the variable nodes connected to the check nodes with the indices being the positions of 1's in the binary representation (M bits) of j. For instance, all the bit nodes in $\Omega_5$ are connected to the first and the third check nodes since $5=(101)_2$. It is seen that to specify a code graph, we do not need to know the exact variable sets $\Omega_j$ since any nodes connected to exactly the same check nodes, i.e., all the nodes in the same set, have no difference in a code graph. Therefore, we define the code graph by the set $\mathcal{L}_M = \{l_j\}_{j=1}^{2^M-1}$, where $l_j$ denotes the cardinality of set $\Omega_j$, i.e., $l_j = |\Omega_j|$. We have $\Sigma_j l_j = N$. To simply the expression of the set $\{l_j\}$, we can enumerate $l_j$ in the increase order of j. Then we only need to present the value of $l_j$ without specifying $l_j$.

Figure 5:
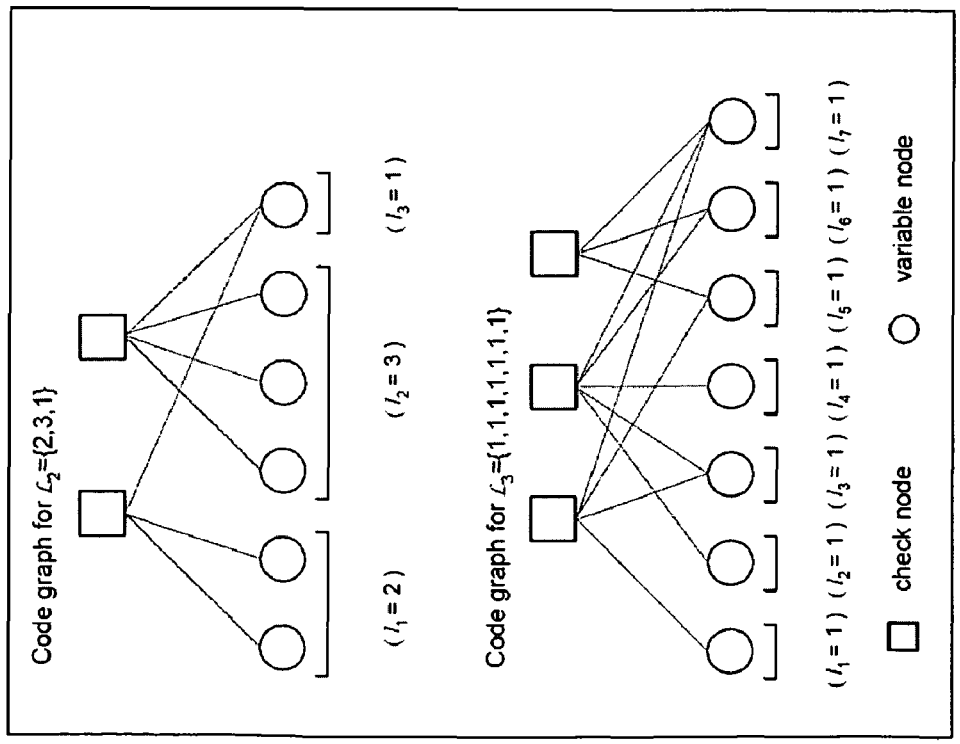
FIG. 5 shows Tanner graphs for understanding code construction in accordance with the invention.

We now explain the code construction for a given $\{l_j\}$ with the following example. We construct the code for the given set $\mathcal{L}_2=\{2,3,1\}$. With the set presentation, we know $\{l_1=2, l_2=3, l_3=1\}$, M=2, and $N=l_1+l_2+l_3=6$, i.e, a (6,4) code. For j=1, since $1=(01)2$ and $l_1=2$, there are two variable nodes connected to first check nodes only. For j=2, since $2=(10)_2$ and $l_2=3$, then three variable nodes are connected the second check nodes. Similarly, for j=3, since we have $3=(11)_2$, $l_3=1$, the last bits connected to both check nodes. The Tanner graph of this code is presented in FIG. 5. Another simple example also shown in FIG. 5 is the code graph for $\mathcal{L}_3=\{1,1,1,1,1,1,1\}$, which is a (7,4) Hamming code.

Note that we may introduce the set $\Omega_0$ for the variable nodes (consequently, a new element $l_0$ in $\mathcal{L}_M$) for general set representation of code graphs. The set $\Omega_0$ means that all the information bits in $\Omega_0$ are not connected to (or protected by) any check nodes. In this report, we exclude this case, i.e., $l_0=0$.

We now define the residual graph to specify the erasure nodes in the code graph. We first define the set $$\Theta_j \triangleq \{erasure \, nodei: i \in \Omega_j\}.$$

Denote $s_j=|\Theta_j|$. Similarly as $\mathcal{L}_M$ specifying the code graph, we define the set $S_{M,n}$ to represent the residual graph of n erasure nodes for M check nodes by $$S_{M,n} \triangleq \{s_j\}_{j=1}^{2^M-1}$$

with $\sum_j s_j = n$, where n is the total number of erasures. Similarly, we can also enumerate the values of $s_j$ in an increasing order of j to simplify the representations. We usually consider $0 < n \leq M$. By studying the residual graphs $\{s_j\}$, we can consider the design of the short codes, i.e., design of $\{l_j\}$, for anti-jamming piecewise coding.

Revisiting the Inventive Code Design Methods

We can see for $M \gg 1$, the number of sets $\Omega_j$ will be extremely large, and the above representation $\{l_j\}$ is not an efficient way to describe the code graph. However, in this report, we consider the design of anti-jamming codes with low redundancy, i.e., design of short codes with a small M. We next present our code design method with the help of such code representation.

Code Design for M=1

For M=1, there is only one solution $\mathcal{L}_1 = \{l_1 = N\}$, i.e., all the parity bits are connected to the only parity check node, i.e., the single parity check (SPC) code. With this code graph, the only residual set is $\{s_1 = 1\}$. Thus, for any single erasure, we can always recover it with the SPC constraint. If we allow the cases that some bits are not connected to any parity-check nodes, i.e., $l_0 \neq 0$, $\{l_1 = N\}$ turns out to be the optimal solution. This explains why we excludes the cases of $l_0 \neq 0$. Hence, we have $Pr(E|n \leq M) = 0$. From equation (5), the packet error rate for anti-jamming piecewise coding with M=1 is then given by $$P_w^{PW1} = \sum_{n=M+1}^{N} P_n \quad (12)$$
$$= 1 - P_0 - P_1$$
$$= 1 - (1-p)^N - Np(1-p)^{N-1}.$$

And the throughput efficiency is $$\eta^{PW1} = \frac{K}{K+1}(P_0 + P_1). \quad (13)$$

Code Design for M=2

When M=2, we consider the design of $\mathcal{L}_2 = \{l_1, l_2, l_3\}$. When n=1, we have three residual graphs: $\{1,0,0\}$, $\{0,1,0\}$, $\{0,0,1\}$. For any of these cases we can recover the erasure bit. Therefore, we have $Pr(E|n=1) = 0$. This can be actually generalized to any M with the residual graphs being $\{s_j = 1, s_{j' \neq j} = 0\}$.

Figure 6:
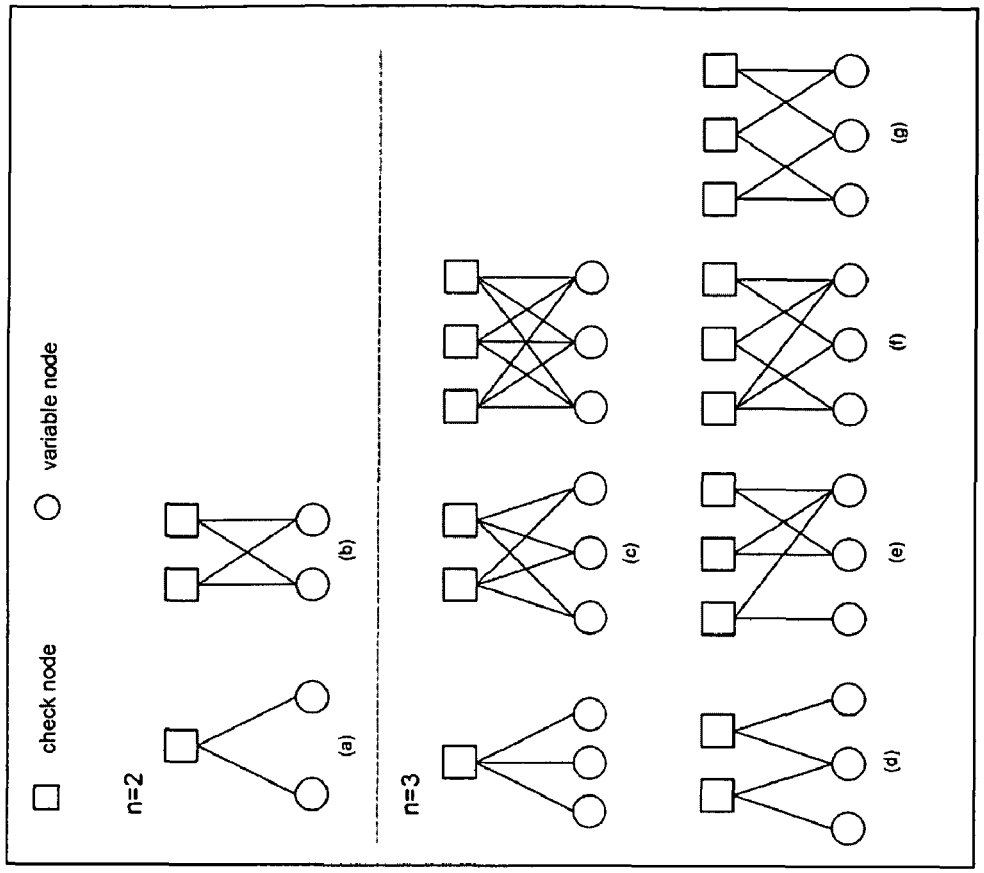
FIG. 6 shows residual graphs for the code condition M=3 redundant blocks for a short code block design in accordance with the invention.

When n=2, as shown in FIG. 6, residual graphs type (a) and (b) are not decodable under iterative decoding. Such residual graphs can be represented by $\{s_j = 2, s_{j' \neq j} = 0\}$, i.e., two erasure nodes belong to the same set $\Omega_j$. For a given code $\{l_j\}$, the number of the residual graphs with two erasures contained in this code is given by $\sum_j \binom{l_j}{2}$. Note that here, as well as the rest of application, we abuse the notation $\binom{l}{s}$ by including $\binom{l}{s} = 0$ if $l < s$. We obtain the error probability for n=2, given by $$Pr(E, n=2) = Pr(E|n=2)P_2 \quad (14)$$
$$= \sum_{j=1}^{2^M-1} \binom{l_j}{2} / \binom{N}{2} P_2$$
$$= \frac{P_2\left(\sum_{j=1}^{3} l_j^2 - N\right)}{N(N-1)}$$

As aforementioned, only the second term in equation (5) depends on the code graph. Since we have $Pr(E|n=1) = 0$, optimizing the code graph to maximize the throughput is equivalent to minimizing the error probability in (14), i.e., $$\min_{\{l_j\}} \sum_j l_j^2, \text{ s.t. } \sum_j l_j = N. \quad (15)$$

The solution of above optimization problem for integer sets $\{l_j\}$ is $l_j = \lfloor N/3 \rfloor$ or $\lceil N/3 \rceil$, with $\sum_{j=1}^{3} l_j = 1$. It is also seen that the optimization problem does not depends $P_2$ and is a general expression for N. Hence, the optimal solution for M=2 is universal for any code length and any jamming rate. The error rate and the throughput efficiency of the optimal codes for M=2 are then given, respectively, by $$P_w^{PW2} = \sum_{n=M+1}^{N} P_n + \frac{P_2\left(\sum_j l_j^2 - N\right)}{N(N-1)} \quad (16)$$
$$= 1 - P_0 - P_1 - P_2\left(1 - \frac{\sum_j l_j^2 - N}{N(N-1)}\right),$$

$$\eta^{PW2} = \frac{K}{K+2}\left[P_0 + P_1 + P_2\left(1 - \frac{\sum_j l_j^2 - N}{N(N-1)}\right)\right], \quad (17)$$

Code Design for M=3

When M=3, we consider the design of $\mathcal{L}_3 = \{l_j\}_{j=1}^{7}$. Now we investigate the error probabilities for $n \geq M$. When n=1, we have $Pr(E|n=1) = 0$. When n=2, similarly as above discussed, we have $$Pr(E, n=2) = P_2 \frac{\sum_{j=1}^{7} l_j^2 - N}{N(N-1)}. \quad (18)$$

(1) All the residual graphs for n=2, i.e., two erasures in the same set $\Omega_j$, combined with one more erasure in the set $\Omega_{j', j' \neq j}$, form the first type of residual graphs for n=3. The number of such residual graphs for n=3 for a given code $\{l_j\}$ is then $\sum_j \sum_{k \neq j} \binom{l_j}{2} l_k$.

(2) The second type of residual graphs have all three erasures in the same set $\Theta_j$, as shown by the graphs in FIG. 6(c). The residual graphs can be represented by $\{s_j = 3, s_{j' \neq j} = 0\}$ with the total number being $\sum_j \binom{l_j}{3}$ for a given code $\{l_j\}$.

(3) As shown in FIG. 6(d), among three erasures, one is connected to two check nodes with the other two connected to these two check nodes separately. The residual graphs $\{s_j\}$ are $\{1,1,1,0,0,0,0\}$, $\{1,0,0,1,1,0,0\}$, and $\{0,1,0,0,1,0,1\}$, respectively. For a given code $\{l_j\}$, the total number of residual graphs in this code is $l_1 l_2 l_3 + l_1 l_4 l_5 + l_2 l_4 l_6$. Similarly, the residual graphs for FIG. 6(e) are $\{1,0,0,0,0,1,1\}$, $\{0,1,0,0,1,0,1\}$, and $\{0,0,1,1,0,0,1\}$, respectively, with the total number of enumerations being $l_1 l_6 l_7 + l_2 l_5 l_7 + l_3 l_4 l_7$. The residual graphs for FIG. 6(f) are $\{0,0,1,0,1,0,1\}$, $\{0,0,1,0,0,1,1\}$, and $\{0,0,0,0,1,1,1\}$, respectively, with the total number of enumerations being $l_3 l_5 l_7 + l_3 l_6 l_7 + l_5 l_6 l_7$. The residual graph for FIG. 6(g) is $\{0,0,1,0,1,1,0\}$ with the total number of enumerations being $l_3 l_5 l_6$.

Denote U as the collections of all the three indices in the products in item (3), i.e., U={(1,2,3),(1,4,5),(2,4,6),(1,6,7),(2,5,7),(3,4,7),(3,5,7),(3,6,7), (5,6,7),(3,5,6)}.

The packet error probability for n=3 is given by $$Pr(E, n = 3) = P_3 \binom{N}{3}^{-1} \left[ \sum_{j=1}^{7} \sum_{k \neq j} \binom{l_j}{2} l_k + \sum_{j=1}^{7} \binom{l_j}{3} + \sum_{(j_1, j_2, j_3) \in U} l_{j_1} l_{j_2} l_{j_3} \right]. \quad (19)$$

We then obtain the frame error probability and the throughput efficiency for M=3 given, respectively, by $$P_w^{PW3} = \sum_{n=M+1}^{N} P_n + \sum_{n=2}^{3} Pr(E|n) P_n \quad (20)$$

$$= \sum_{n=M+1}^{N} P_n + P_2 \frac{\sum_{j=1}^{7} l_j^2 - N}{N(N-1)} + P_3 \binom{N}{3}^{-1}$$

$$\left[ \sum_{j=1}^{7} \sum_{k \neq j} \binom{l_j}{2} l_k + \sum_{j=1}^{7} \binom{l_j}{3} + \sum_{(j_1, j_2, j_3) \in U} l_{j_1} l_{j_2} l_{j_3} \right],$$

$$\eta = P_0 + P_1 + P_2 \left( 1 - \frac{\sum_{j=1}^{7} l_j^2 - N}{N(N-1)} \right) + P_3 -$$

$$P_3 \binom{N}{3}^{-1} \left[ \sum_{j=1}^{7} \sum_{k \neq j} \binom{l_j}{2} l_k + \sum_{j=1}^{7} \binom{l_j}{3} + \sum_{(j_1, j_2, j_3) \in U} l_{j_1} l_{j_2} l_{j_3} \right].$$

To design the code to maximize the throughput efficiency, we need to find the code graph $\{l_j\}$ that minimizes the frame error probability, i.e., $$\min_{\{l_j\}} P_w^{PW3} \quad \text{s.t.} \quad \sum_{j=1}^{7} l_j = N. \quad (21)$$

To solve the above optimization, we need to enumerate $\{l_1\}$. The optimal code design process for M=3 is summarized as follows.

Process 1 [Optimal design method for anti-jamming piecewise codes with M=3.] See FIG. 3.

---

Set code length N and jamming rate p.
  (a) Compute $P_n$ according to equation (4).
  (b) Initially set $P_e^*$.
  For $l_1 = 0, 1, \ldots, N$,
  For $l_2 = 0, 1, \ldots, N - l_1$
  .
  .
  .
  For $l_6 = 0, 1, \ldots, N - \sum_{j=1}^{5} l_j$
  $l_7 = N - \sum_{j=1}^{6} l_j$.

With $\{l_j\}$, compute $P_e(\{l_j\})$ according to equations (18) and (19).
  If $P_e(\{l_j\}) < P_e^*$, set $P_e^* = P_e(\{l_j\})$, $\mathcal{L}_3^* = \{l_j\}$.
  End of $l_6$; End of $l_5$; . . . ; End of $l_1$.
  (c) Output $\mathcal{L}_3^*$.

---

It can be seen that the optimum $\mathcal{L}_3^*$ is not a universal solution, since it depends on the code length N and the jamming rate p. However, from the optimization results, we find that for $p \leq 0.05$, the solution for a particular N does not change with p.

Code Design for small M, M>3

We can see that as M increases, the number of residual graphs increases exponentially, as well as the enumerations of the code graph sets $\{l_j\}$. It is then infeasible to perform exhaustive search to obtain the optimal codes.

By examining the optimization results of M=3 for various N and p, we find that for small p, e.g., p<0.05, and not a large N, e.g., N<100, the $l_j$'s in the optimized code are approximately the same. The maximum difference of $l_j$ and $l_k$ is one. Based on this observation, we propose the following simple suboptimal code design method for small M.

Process 2 [Simple design method for anti-jamming piecewise codes with small M>3.]

---

Set code length N .
  (a) Compute $L^* = \lfloor N/(2^M - 1) \rfloor$, $N_L = N - L(2^M - 1)$, and
  set $l_j^* = L^*$, $j = 1, \ldots, 2^M - 1$ .
  (b) Set $t = 0$ . Do the following loops until $t = N_L$ .
  For $m = 1, \ldots, M$
  For $j = 1, \ldots, 2^M - 1$
  If the weight(binary of j) = m , Then $l_j^* = l_j^* + 1$, $t = t + 1$ .
  End of j ; End of m .
  (c) Output $\mathcal{L}_M^* = \{l_j^*\}$ .

---

For M>3, we do not have analytical expressions for frame error probability $P_w$ and throughput efficiency $\eta$, and must resort to numerical simulations.

Without anti-jamming coding techniques, the systems in inference channels suffer serious throughput loss due to strong interference or deep fading. The inventive anti-jamming piecewise coding method for inference channels, and constructing short block codes for anti-jamming piecewise coding, provides significant improvement in throughput efficiency of systems in parallel inference channels. For a jamming rate p=0.01, the inventive anti-jamming coding method improves the throughput efficiency by 38% over the systems without employing anti-jamming coding. Based on evaluation studies, compared to the rateless coding, the inventive anti-jamming method can achieve 3% high throughput efficiency gain with 50% less overhead. The inventive anti-jamming coding method also enjoys extremely low-complexity encoding and decoding, and smaller decoding latency.

The present invention has been shown and described in what are considered to be the most practical and preferred embodiments. It is anticipated, however, that departures may be made therefrom and that obvious modifications will be implemented by those skilled in the art. It will be appreciated that those skilled in the art will be able to devise numerous arrangements and variations, which although not explicitly shown or described herein, embody the principles of the invention and are within their spirit and scope.

What is claimed is:

1. A method for encoding comprising the steps of:
   encoding K blocks of information for transmission on N subchannels responsive to a number of redundant blocks M according to one of:
   i) employing a single parity check code when the number of redundant blocks M is about 1;
   ii) employing a code exhibited by a code graph having one third of variable nodes are connected to one of the check nodes, another one third of variable nodes is connected to the other check node and the remaining one third of variable nodes is connected to both check nodes, when the number of redundant blocks M is 2;
   iii) employing a first process for determining a code for the K blocks of information, when the number of redundant blocks M is about 3 together with K blocks of information less than about 150 or the number of redundant blocks M is about 4 together with K blocks of information less than about 20; and
   iv) employing a second process for determining a code for the K blocks of information with redundant block M values other than for steps i), ii) and iii).

2. The method of claim 1, wherein the first process comprises determining an error rate responsive to a jamming rate and code length N and searching through a set of code graphs and corresponding error rates to determine a desired error rate.

3. The method of claim 2, wherein the searching through a set of code graphs comprises an iterative search of error rates corresponding to a set of code graphs.

4. The method of claim 3, wherein the searching through a set of code graphs and corresponding error rates comprises determination of the error rate which cannot be recovered from decoding process with number of erasures n=2.

5. The method of claim 3, wherein the searching through a set of code graphs and corresponding error rates comprises a determination in accordance with the relationship:

$$Pr(E, n=2) = P_2 \frac{\sum_{j=1}^{7} l_j^2 - N}{N(N-1)}$$

where Pr(E,n=2) is a packet error probability for n=2 packets.

6. The method of claim 3, wherein the searching through a set of code graphs and corresponding error rates comprises determination of the error rate (which cannot be recovered from decoding process) with number of erasures n=3.

7. The method of claim 3, wherein the searching through a set of code graphs and corresponding error rates comprises a determination in accordance with the relationship:

$$Pr(E, n=3) = P_3 \binom{N}{3}^{-1} \left[ \sum_{j=1}^{7} \sum_{k \neq j} \binom{l_j}{2} l_k + \sum_{j=1}^{7} \binom{l_j}{3} + \sum_{(j_1, j_2, j_3) \in U} l_{j_1} l_{j_2} l_{j_3} \right]$$

where Pr(E,n=3) is a packet error probability for n=3 packets.

8. The method of claim 2, wherein the searching through a set of code graphs and corresponding error rates comprises enumerating all possible sets of $\{l_1, l_2, \ldots, l_{2^M-1}\}$ which forms a code graph with total number of nodes being N, (i.e., $$\sum_{j=1}^{2^M-1} l_j = N),$$

and computing the error rate $P_e$ for every code graph $\{l_1, l_2, \ldots, l_{2^M-1}\}$ and find the optimal one with minimal $P_e$.

9. The method of claim 2, wherein the searching through a set of code graphs and corresponding error rates comprises the following iteration:

---
initially setting $P_e^*$,
for $l_1 = 0, 1, \ldots, N$,
for $l_2 = 0, 1, \ldots, N - l_1$,
.
.
.
for $l_6 = 0, 1, \ldots, N - \sum_{j=1}^{5} l_j$, with $\{l_j\}$, compute $P_e(\{l_j\})$ according to formulaic relationships,
if $P_e(\{l_j\}) < P_e^*$, set $P_e^* = P_e(\{l_j\})$, $\mathcal{L}_s^* = \{l_j\}$,
end of $l_6$; end of $l_5$; . . . ; end of $l_1$,
--- where $P_e^*$ is the set of error rates corresponding to a set of code graphs $\{l_j\}$.

10. An encoder for encoding K blocks of information for transmission on N subchannels responsive to a number of redundant blocks M, comprising:
   i) a single parity check code when the number of redundant blocks M is about 1;
   ii) a code exhibited by a code graph having one third of variable nodes are connected to one of the check nodes, another one third of variable nodes is connected to the other check node and the remaining one third of variable nodes is connected to both check nodes, when the number of redundant blocks M is 2;
   iii) a code for the K blocks of information, when the number of redundant blocks M is about 3 together with K blocks of information less than about 150 or the number of redundant blocks M is about 4 together with K blocks of information less than about 20 determined by a first process; and
   iv) a code for the K blocks of information with redundant block M values other than for steps i), ii) and iii) determined according to a second process.

11. The encoder of claim 10, wherein the step ii) comprises determining an error rate responsive to a jamming rate and code length N and searching through a set of code graphs and corresponding error rates to determine a desired error rate.

12. The encoder of claim 11, wherein the searching through a set of code graphs comprises an iterative search of error rates corresponding to a set of code graphs.

13. The encoder of claim 11, wherein the searching through a set of code graphs and corresponding error rates comprises the following iteration:

```
initially setting P_e*,
for l_1 = 0, 1, ..., N,
for l_2 = 0, 1, ..., N - l_1,
.
.
.
for l_6 = 0, 1, ..., N - Σ_{j=1}^{5} l_j,
,
with {l_j}, compute P_e({l_j}) according to formulaic relationships,
if P_e({l_j}) < P_e*, set P_e* = P_e({l_j}), L_3* = {l_j},
end of l_6; end of l_5; ...; end of l_1,
```

14. The encoder of claim 13, wherein the searching through a set of code graphs and corresponding error rates comprises a determination in accordance with the relationship:

$$Pr(E, n = 2) = P_2 \frac{\sum_{j=1}^{7} l_j^2 - N}{N(N-1)}$$

where $Pr(E,n=2)$ is a packet error probability for n=2 packets.

15. The encoder of claim 13, wherein the searching through a set of code graphs and corresponding error rates comprises a determination in accordance with the relationship:

$$Pr(E, n = 3) = P_3 \binom{N}{3}^{-1} \left[ \sum_{j=1}^{7} \sum_{k \neq j} \binom{l_j}{2} l_k + \sum_{j=1}^{7} \binom{l_j}{3} + \sum_{(j_1, j_2, j_3) \in U} l_{j_1} l_{j_2} l_{j_3} \right]$$

where $Pr(E,n=3)$ is a packet error probability for n=3 packets.

16. The encoder of claim 11, wherein the assigning a weighting to each of the partitioned nodes comprises the following iterative process:

```
set t = 0, do the following loops until t = N_L,
for m = 1,...,M,
for j = 1,...,2^M -1,
If the weight(binary of j) = m, Then l_j* = l_j* + 1, t = t + 1,
end of j; end of m.
```

17. A method for encoding an anti jamming piece-wise code comprising the steps of:
   encoding K blocks of information for transmission on N subchannels responsive to a number of redundant blocks M according to one of:
   i) employing a single parity check code when the number of redundant blocks M is about 1;
   ii) employing a code exhibited by a code graph having one third of variable nodes are connected to one of the check nodes, another one third of variable nodes is connected to the other check node and the remaining one third of variable nodes is connected to both check nodes, when the number of redundant blocks M is 2;
   iii) determining an error rate responsive to a jamming rate and code length N and searching through a set of code graphs and corresponding error rates to determine a desired error rate for determining a code for the K blocks of information, when the number of redundant blocks M is about 3 together with K blocks of information less than about 150 or the number of redundant blocks M is about 4 together with K blocks of information less than about 20; and
   iv) partitioning the nodes to several sets to form a code graph that is a particular code for determining a code for the K blocks of information with redundant block M values other than for steps i), ii) and iii).

* * * * *